United States Patent
Jagannathan

(10) Patent No.: US 11,050,486 B2
(45) Date of Patent: Jun. 29, 2021

(54) LOOP DETECTION IN A PASSIVE OPTICAL LAN NETWORK

(71) Applicant: Nokia Solutions and Networks Oy, Espoo (FI)

(72) Inventor: Aravindan Jagannathan, Chennai (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/783,674

(22) Filed: Feb. 6, 2020

(65) Prior Publication Data

US 2020/0267460 A1   Aug. 20, 2020

(30) Foreign Application Priority Data

Feb. 14, 2019   (EP) ..................................... 19157175

(51) Int. Cl.
   *H04B 10/079* (2013.01)
(52) U.S. Cl.
   CPC ................ *H04B 10/0793* (2013.01)
(58) Field of Classification Search
   CPC ............................................ H04B 10/03–0799
   See application file for complete search history.

(56) References Cited

U.S. PATENT DOCUMENTS

| | | | | |
|---|---|---|---|---|
| 2008/0232794 A1* | 9/2008 | Absillis | .............. | H04B 10/0793 398/9 |
| 2009/0041455 A1* | 2/2009 | Shi | .......................... | H04L 45/00 398/17 |
| 2012/0251114 A1* | 10/2012 | Effenberger | ............ | H04L 69/08 398/66 |
| 2013/0286874 A1* | 10/2013 | Lafleur | ............... | H04L 41/5038 370/252 |
| 2014/0204768 A1 | 7/2014 | Chen | | |
| 2016/0006631 A1 | 1/2016 | Qin | | |

(Continued)

FOREIGN PATENT DOCUMENTS

| | | |
|---|---|---|
| CN | 102055525 A | 5/2011 |
| CN | 104219122 A | 12/2014 |

(Continued)

OTHER PUBLICATIONS

Jeong-dong Ryoo, et al., "Ethernet Ring Protection for Carrier Ethernet Networks," IEEE Communications Magazine, vol. 46, is. 9, Sep. 2008.

(Continued)

*Primary Examiner* — Casey L Kretzer
(74) *Attorney, Agent, or Firm* — Harness, Dickey & Pierce, P.L.C.

(57) ABSTRACT

In a method for detecting loops between ports in a point-to-multipoint Gigabit Passive Optical Network, GPON, based access network, the GPON based access network may comprise an Optical Line Terminal, OLT, coupled with a plurality of Optical Network Units, ONUs. Each ONU may comprise a plurality of ports. The method may comprise a step of transmitting loop detection frames from a source port and a step of monitoring traffic that is received at a destination port. If a loop detection frame is received at the destination port, the method may further comprise a step of blocking traffic transmission and reception at the destination port.

18 Claims, 6 Drawing Sheets

(56) References Cited

U.S. PATENT DOCUMENTS

| | | | |
|---|---|---|---|
| 2016/0204857 A1* | 7/2016 | Xu | H04B 10/0795 |
| | | | 398/25 |
| 2017/0180153 A1 | 6/2017 | Subramaniam et al. | |
| 2017/0201320 A1* | 7/2017 | Prause | H04B 10/27 |
| 2017/0353328 A1 | 12/2017 | Chickering et al. | |
| 2018/0026872 A1 | 1/2018 | Manthiramoorthy et al. | |

FOREIGN PATENT DOCUMENTS

| | | |
|---|---|---|
| CN | 105591692 A | 5/2016 |
| CN | 106878057 A | 6/2017 |
| EP | 2256995 A2 | 12/2010 |
| EP | 3197074 A1 | 7/2017 |
| TW | 201438416 A | 10/2014 |
| WO | WO-2008/057975 A2 | 5/2008 |

OTHER PUBLICATIONS

Extended European Search report dated Aug. 2, 2019 in European Application No. 19157175.1.
Xerox Corporation, "Ethernet Configuration Testing Protocol CTP," May 8, 1986, [retrieved from the internet: URL:http://www.mit.edu/people/jhawk/ctp.pdf].

* cited by examiner

LOOP DETECTION IN A PASSIVE OPTICAL LAN NETWORK

CROSS-REFERENCE TO RELATED APPLICATIONS

This application claims priority under 35 U.S.C. § 119 to European Patent Application No. 19157175.1, filed Feb. 14, 2019, the entire contents of which are incorporated herein by reference.

TECHNICAL FIELD

The present document relates to loop detection in a Passive Optical LAN (POL) Network. In particular, the present document relates to methods and apparatuses for detecting user-side loops across ONUs in a POL network.

BACKGROUND

Gigabit Passive Optical Networks (GPON) are Optical Systems for access networks, based on the ITU-T specifications G.984 series. A GPON can provide services at high bandwidth (high data rate) to long reach (e.g., up to 20 km). A typical GPON based POL network topology consists of an Optical Line Termination (OLT), a number of Optical Network Units (ONUs) and a (passive) 1:N optical splitter including fibers connected between the OLT and ONUs. In particular, the OLT provides an interface between a PON and a service provider's core network. On the other hand, the ONUs terminate the PON and present service interfaces to the end users through a number of ports, e.g., Ethernet ports for coupling to home or enterprise networks.

Generally speaking, in a Passive Optical Network (PON), in particular in a GPON based access network, loops (e.g., physical loops) may occur or may be created across Optical Network Unit (ONU) User Network Interface (UNI) ports or even on a single UNI port. The loops can be sometimes quite disruptive as they may create traffic storms which bring down the network throughput and also impact network services.

In particular, for residential deployments of GPON access, it is possible that loops between the UNI ports of the same ONU are (e.g., accidentally) created. However, loops between ports across different ONUs is generally unlikely to happen in a residential deployment.

While on the other hand, for enterprise deployments of GPON based POL, loops can occur across ONUs as well. In particular, the following cases may happen in an enterprise deployment:
  (a) a loop between 2 (Ethernet) ports on the same ONU;
  (b) a loop between 2 (Ethernet) ports on 2 ONUs on the same GPON branch (i.e., same PON port on the OLT);
  (c) a loop between 2 (Ethernet) ports on 2 ONUs on 2 different GPON branches (i.e., different PON ports on the OLT); and
  (d) a loop on a LAN switch behind an ONU port.

Notably, a GPON access network shows a point to multipoint network topology. Typically, the multi-point scale in the GPON network is huge. For instance, a typical Intelligent Services Access Manager (ISAM) in a GPON based network may support up to thousands of ONUs and even tens of thousands of user (ONU UNI) ports.

SUMMARY

In view of some or all of the above problems (and use cases), the present disclosure generally proposes a method for detecting loops between ports in a GPON based access network and a control unit configured to perform such method.

Generally speaking, the present disclosure provides a mechanism for detecting loop(s) and a way of identifying the port (where the loop is detected) and the respective ONU corresponding to that port. The loop detection mechanism may be implemented at ONUs and may be provisioned from the OLT (e.g., via GPON ONU Management and Control Interface/OMCI messages). Loop detection frames may be generated from each ONU port for which loop detection functionality is enabled (e.g., via provisioning). The loop detection frames may contain specific details that are needed to identify the (source) port which generates the loop detection frames. Any port (with loop detection enabled) that receives a loop detection frame may conclude that a loop is detected at that port. In this case, the respective port may be blocked for all traffic for a certain period of time. Further, the present disclosure also provides a clear reporting mechanism for the offended and offending network elements (e.g., ports, ONUs, OLT). For example, the port at which the loop is detected (i.e., the blocked port) may subsequently report a loop (detected) alarm towards the OLT or even higher level of network nodes of the GPON network (e.g., the Element Management System/EMS, or the Operation Support System/OSS). The reported alarm message may contain details needed to identify the blocked port (i.e., the port that received the loop detection frame) and may optionally contain details of the source port. Yet further, the present disclosure also provides a method for ensuring that the blocked state of the port (at which the loop is detected) does not toggle (by accident or by mistake). For example, this may be achieved by continuing the check for loop detection frame reception even in the blocked state of that port.

As a broad aspect, there is provided a method for detecting loops between ports in a point-to-multipoint GPON based access network. As illustrated above, the GPON based access network may comprises an OLT coupled with a plurality of ONUs. The OLT and the ONUs may be connected through a passive 1:N optical splitter (or more) using optical fibers. In a GPON based network, the number of output ports N of the optical splitter may for example be 32, or even up to 128. In some cases, the optical splitter together with the fibers (and possibly with some other network elements like optical connectors, etc.) may be collectively referred to as an Optical Distribution Network (ODN). Each ONU may have a plurality of ports for connecting user networks. Typically, an ONU may have 8, 16, 32, or up to 64 ports. End user devices, e.g., desk computers, mobile devices, etc., (of a home premise or an enterprise premise) may be (directly) connected to the ONU at respective ports, or (indirectly) connected to the ONU via another network entity, e.g., an access point (for instance a Wi-Fi AP) or a switch. The access point or the switch may be directly connected to the respective ports of the ONU. Configured as such, the point-to-multipoint GPON based network can provide a high data rate (e.g., ~2.4 Gbit/s downstream and ~1 Gbit/s upstream) at a wide range (e.g., up to 20 km). However, as mentioned above, a typical ISAM equipment in a GPON based network may support up to thousands of ONUs and eventually resulting in tens of thousands of (ONU) ports. Therefore, considering the large number of ONU ports present in the network (especially in enterprise deployment scenarios), it would be very like that (physical) loops may occur in the network. For example, two ports (of the same ONU or of two different ONUs) may be accidentally connected to each other (e.g., by network cables), thereby creating a (physical) loop between that two ports. As another example, (physical) loops may also happen at the switch that is connected between the end users and the ONU(s). Most of the times, the (physical) loops in the network can be quite disruptive as they may create traffic storms (e.g., by feeding the received data traffic back into the network) which may bring down the network throughput and also impact network services.

In particular, it is well known that any data packet sent/transmitted from a port of an ONU should be received (consumed) by the end user devices such that the data packet should never return back (loop back) to the ONU or any other ONUs in the network. In this respect, the reception of the loop detection frame at the destination port can be used to conclude that a potential loop exists in the network, or in other words, that a loop is detected.

Therefore, in order to detect the loops between ports (on the same ONU or on different ONUs), the method may comprise a step of transmitting loop detection frames from a source port. After the loop detection frames are transmitted, the method may subsequently continue to monitor the traffic received at a destination port. Depending on different circumstances, the monitoring of the received traffic may comprise filtering a selection of all the traffic received at the destination port. For instance, the filtering process may be achieved by a hardware filter installed on the ONU which can perform filtering operations according to a type field (e.g., a two-octet "EtherType" field in an Ethernet II standard compliant PDU) in the received data packets. Other typical means of data filtering may also be readily known to the skilled person, thus the respective description may be omitted for the sake of conciseness.

In some cases, depending on other circumstances (e.g., hardware/CPU capabilities of the ONU), the monitoring of the traffic reception may comprise rate limiting. That is to say, the rate of the data received at the destination port may be controlled (limited). By way of example and without any limitation, the data rate of the traffic reception at the destination port may be limited from 1 Mb/s down to 500 kb/s. In particular, the rate limiting in the present disclosure may relate to limiting the rate of "loop detection frames" received at a destination port, which may be described in the unit of fps (frames per second). For example, assuming that the interval of generation (and transmission) of loop detection frames from a source port is set to be 100 milliseconds, it means that 10 loop detection frames can be received in 1 second (which translates to 10 fps). A recommended value for limiting the rate of loop detection frames is 10 fps.

If, during the process of monitoring the traffic reception, a loop detection frame is received at the destination port, the method may comprise a subsequent step of blocking traffic transmission and reception at the destination port. In other words, no data packet would be transmitted from the destination port, once the loop detection frame is received at that port. Furthermore, any (incoming) data packet received at the destination port would be dropped (e.g., by filtering). Preferably, the destination port may be blocked immediately after the loop detection frame is received at that port. In some cases, the block process may be achieved via the hardware filter installed on the ONU so that all the received traffic (including the loop detection frames) can be immediately dropped (filtered) by the hardware filter without passing to higher layers.

In some examples, once the destination port is blocked, an alarm message indicating that a loop has been detected may be generated and transmitted from the (blocked) destination port. The alarm message may be transmitted to a management unit, e.g., an OLT. In a GPON based access network, this message may be transmitted in compliance with the GPON OMCI specification. The reported alarm message may contain detailed information needed to identify the blocked port (i.e., the port that received the loop detection frame). For instance, these details may include the ID of the blocked port, and/or the serial number of the ONU to which the blocked port belongs. Additionally, the alarm message may also contain details of the source port (e.g., port ID and the serial number of the ONU of the respective source port). Depending on system requirements, this alarm message may be further passed to other network management entities of the GPON network (e.g., the EMS, and/or the OSS).

In some examples, the loop detection frame may comprise one of a MAC address of the respective ONU of the source port, a serial number of the respective ONU of the source port, a port ID of the source port, or a combination thereof. In some cases, for correctly and efficiently detecting the potential loop, it may be preferable to include all the details, i.e., all of the MAC address of the respective ONU, the serial number of the respective ONU and the port ID of the source port, when generating the loop detection frame.

In some examples, the destination port may be blocked for a predetermined time period before subsequently being unblocked again. That is to say, a timer set to the predetermined time period may be provided such that the destination port can be blocked (i.e., kept in the blocked state) from traffic transmission and reception until the timer expires. The timer may be configured by the ONU or other suitable management network entities in the network, depending on different circumstances and/or requirements. For example, the timer may be set (configured) to a value between 0 to 600 seconds. In some cases, a default value (e.g., 300 seconds) may be provided (or preconfigured). In some cases, a timer value set to 0 may be considered as indefinite. That is to say, the destination port may be kept blocked permanently until a network personnel (e.g., from the network operator or from the network hardware vendor) performs a manual unblock process (e.g., after confirming that the loop has be removed from the network).

In some examples, the method may further comprise, at some point of time before the timer expires (e.g., around 80% of the timer value), temporarily enabling the blocked destination port for transmitting and receiving further loop detection frames. In other words, from that point of time (e.g., around 80% of the timer value) on, only the transmission and reception of the loop detection frame may be (temporarily) allowed (e.g., via hardware filtering), while all other traffic (e.g., regular data traffic) should still be blocked from transmission and reception. Therefore, during this time period the destination port is still kept in the blocked state. Notably, in some cases, it is possible that the physical loop in the network may cause the port's own transmission packets (e.g., the loop detection packet, or other data packets) to loop back to the same port. That is to say, in this particular scenario, the source port (where the loop detection frame is transmitted) and the destination port (where the loop detection frame is received) are essentially the same port. In order to capture this kind of scenario, it would then be preferable to also temporarily enable transmission of further loop detection frames, instead of only enabling reception of the loop detection frames which might be sufficient in some cases (e.g., when the source port and the destination ports are two distinct ports).

Once the blocked destination port is temporarily awake (enabled) for checking the further loop detection frame, in some examples, no further loop detection frame may be received at the destination port until the predetermined timer expires. In this case, this condition (i.e., not receiving any further loop detection frames at the destination port) may be used as an indication that the physical loop has already been removed from the network (e.g., manually by a system administrator). Consequently, the blocked state at the destination port can be removed so that traffic transmission and reception for all data packets at the destination port can be re-enabled (unblocked).

In some examples, after the destination port has been unblocked, a further message for indicating that the loop has been (physically) removed may be generated and transmitted from the destination port to the OLT. This message may be used for clearing the previously generated alarm message. If needed, similar loop-cleared messages may be sent to other management entities in the network (e.g., the EMS/OSS). In some cases, the unblocking process and the subsequent generation of the clear message may be performed automatically once the physical loop is manually removed (e.g., by the Admin). This kind of automatic operations may be triggered e.g., based on a (alarm) notification, or the like. Consequently, the port would become (fully) operational automatically.

However, in some other examples, a further loop detection frame may be still received at the destination port before the timer expires. This reception of further loop detection frame may imply that the loop still exists in the network system. For instance, this may happen because the previously detected loop has not yet been removed, or a new loop affecting the (same) destination port has occurred in the meantime. In any case, that port cannot be unblocked. Instead, the destination port may (immediately) stop transmitting and receiving further loop detection frames and may be put back to the blocked state again. Moreover, the blocked state of the destination port may be further extended (e.g., for another block period) after the present timer gets expired. Depending on circumstances or implementations, the port may or may not send another alarm message to the OLT.

By enabling transmission and reception of further loop detection frames (shortly) before the timer expires (instead of directly unblocking the port after the timer expiry), the ONU can check whether the loop still exists in the network or not, such that undesirable toggling of the ports (i.e., unnecessary toggling between the blocked and unblocked states) may be avoided (or largely reduced).

In some examples, if there are too many block period cycles (i.e., the destination port is blocked for too many times), that specific destination port may be completely shut down. For example, this may be achieved by checking whether the total time period for which the port being blocked exceeds a predetermined (configurable) port shut-down timer. As another example, this may also be achieved by checking the number of times that the port is put into the blocked state against a predetermined (configurable) port shut-down counter. In this case, the system Admin shall need to remove the physical network loop first, before (manually) bringing up the port again.

In some examples, the loop detection frame may be encoded in compliance with certain standard before being transmitted. For instance, the loop detection frame may be generated as a PDU according to the Ethernet Configuration Testing Protocol (CTP) defined by the Ethernet II standard. According to the Ethernet II standard, an Ethernet II frame (PDU) defines a two-octet (i.e., 2 Byte) "EtherType" field, preceded by a Destination MAC Address and a Source MAC Address (each occupies 6 Byte), and followed a Payload field (which may occupy from 46 up to 1500 Byte) and a 4-Byte CRC checksum field. In some cases, the Destination MAC Address, Source MAC Address and the EtherType may be collectively referred to as a MAC Header. In particular, according to the CTP, the EtherType field is set to a predefined value, e.g., 0x9000. Furthermore, if the Ethernet Configuration Testing Protocol is to be used (for encoding the loop detection frame), the Source MAC Address field and the Destination MAC Address field in the PDU as defined by Ethernet II may be generally filled with the same value. In other words, the Source MAC Address field is set to be equal to the Destination MAC Address. Incidentally, it is further noted that by using the standard Ethernet II protocol, the filtering (e.g., hardware filtering) of the received traffic at the destination port could be easily achievable, e.g., by parsing (dissecting) the EtherType field of the data packets.

Depending on different circumstances and requirements, various implementations may be applied to the encoding of the loop detection frame so that the details of the loop detection frame can fit in the Ethernet II PDU, in particular the CTP PDU.

In some cases, the information of the MAC address of the ONU to which the respective source port belongs, the serial number of the ONU to which the respective source port belongs, and the port ID of the respective source port may be coded into the Source MAC Address field of the CTP PDU. Notably, as mentioned above and as is well known in the art, the Source MAC Address field occupies 6 bytes and may for example be represented as in the format of ZZ:XX:XX:XX:XX:YY. In such case, it may be that not all the detailed information of loop detection frame can be completely fit in this 6-octet Source MAC Address field. Consequently, operations like truncation (or any other suitable manners) may be necessary so that the choice of the Source MAC address to be used in the loop detection packets for each UNI port can be structured in such a way to clearly identify the ONU and UNI port (of the source that generates these packets). For instance, the port ID of the source port may be filled into the "YY" part of the Source MAC Address field. In typical deployments, one byte should be sufficient for distinguishing the ports from each other (from a local scope). Next, a part of the serial number (e.g., the last four bytes of the serial number which typically occupies 8 Byte) may be filled into the "XX" part of the Source MAC Address field. Finally, the "ZZ" part of the Source MAC Address field may be filled similarly, for example by a part of the MAC address of the ONU to which the respective source port belongs, or by some other value alike that could be used to serve the purpose. Configured as such, a value used as the MAC address that is unique across the POL network can be defined and utilized, for each of the ONU UNI ports.

In some other cases, the Payload field of the CTP PDU (which occupies 46 bytes and is generally filled with all zeros) may also be exploited (in order to fit in all the information of the loop detection frame). In such case, the Source MAC Address field of the CTP PDU may be filled with the (complete) MAC address of the ONU to which the respective source port belongs, and the (complete) serial number (e.g., 8 bytes) of the ONU to which the respective source port belongs and the (complete) port ID (e.g., 1 byte) of the respective source port may be coded into the Payload field of the PDU. For instance, the ONU serial number and the port ID may be filled into the first 9 bytes of the Payload field. Notably, no truncation operations would be necessary in these cases. Moreover, the unused bytes of the Payload field of the CTP PDU may be further exploited (e.g., to fill in additional information that needs to further identify the loop), if needs be.

In some examples, the source port and the destination port may belong to the same ONU. While in some other examples, the source port and the destination port may belong to two different ONUs. In particular, these two ONUs may be connected to the same port on the OLT (i.e., belong to the same GPON branch), or may be connected to different PON ports on the OLT (i.e., belong to two different GPON branches). That is to say, the proposed method may be provided to detect (identify) loops occurred not only on ports of the same ONU, but also on ports across different ONUs.

In some examples, and even preferably, the loop detection frame may be periodically sent out from the source port. The interval between two consecutive transmissions of the loop detection frame (i.e., the periodicity) may be provisioned (e.g., by the operator), depending on different circumstances and requirements. For instance, the periodicity may be configured as a value between 100 milliseconds to 10 seconds. In some cases, a default value (e.g., 1 second) may be provided (or preconfigured). Though a smaller value of periodicity has the advantage of quick detection of potential loops, the choice should also be based on other conditions, e.g., the hardware capability of the ONU, or the like.

The proposed method generally only blocks (or shutdowns) the destination port where the loop detection frame is received. This may be sufficient because typically it is the destination port (i.e., the receiving port) that actually causes service/QoS impacts in the access network as it feeds the (received) traffic back into the network thereby creating a traffic storm. Nevertheless, in some further examples, if the number of loops detected for the same source port exceeds a predetermined limit (e.g., maximum number of loops allowed), the method may also comprise a step of blocking traffic transmission and reception at that specific source port. In other words, if too many loop alarms detected all point to the same source port, the source port should also be blocked or even completely shut down, if needs be. Notably, in some cases where the source port resides in another ONU (which the ONU with the destination port has no control over), the blocking (or shutdown) process of that source port may require the provision of the OLT (or the OSS).

It is to be noted that, in some cases due to broadcast storms created by a loop, many destination ports (across many ONUs connected to the OLT) may all receive the loop detection frames at (nearly) the same time. Consequently, these ports would be blocked and possibly report respective alarm messages also at (nearly) the same time, as illustrated above. Once the physical loop is removed manually, all the alarms would also be automatically cleared and those ports would become operational again.

According to another broad aspect, there is provided a control unit for detecting loops between ports in a point-to-multipoint GPON based access network. The control unit may be configured to perform the methods as illustrated above, thus repeated description thereof may be omitted for reasons of conciseness.

In particular, in some examples, the control unit may be comprised within an ONU. More particularly, a respective control unit may comprised in a plurality of ONUs deployed in the POL network. In some other examples, it is also possible that the control unit may be comprised within another (central) management entity or form part of a standalone network entity.

Implementations of the disclosed apparatuses may include using, but not limited to, one or more processor, one or more application specific integrated circuit (ASIC) and/or one or more field programmable gate array (FPGA). Implementations of the apparatus may also include using other conventional and/or customized hardware such as software programmable processors.

It will be appreciated that method steps and device/apparatus features may be interchanged in many ways. In particular, the details of the disclosed devices can be implemented as a method and vice versa, as the skilled person will appreciate. In addition, the above aspects may be combined in many ways, even if not explicitly disclosed. The skilled person will understand that these combinations of aspects and features/steps are possible unless it creates a contradiction which is explicitly excluded.

Other and further embodiments of the present invention will become apparent during the course of the following discussion and by reference to the accompanying drawings.

BRIEF DESCRIPTION OF THE FIGURES

Embodiments of the disclosure are explained below in an exemplary manner with reference to the accompanying drawings, wherein FIG. 1 schematically illustrates an exemplary POL topology wherein loops may occur in the network;

FIG. 3-B schematically illustrates another exemplary loop detection message flow according to an embodiment of the present invention;

DETAILED DESCRIPTION

Generally speaking, the proposed method and control apparatus can be used for detecting (physical) loops between ports in a point-to-multipoint access network, like a GPON based access network.

Figure 1:
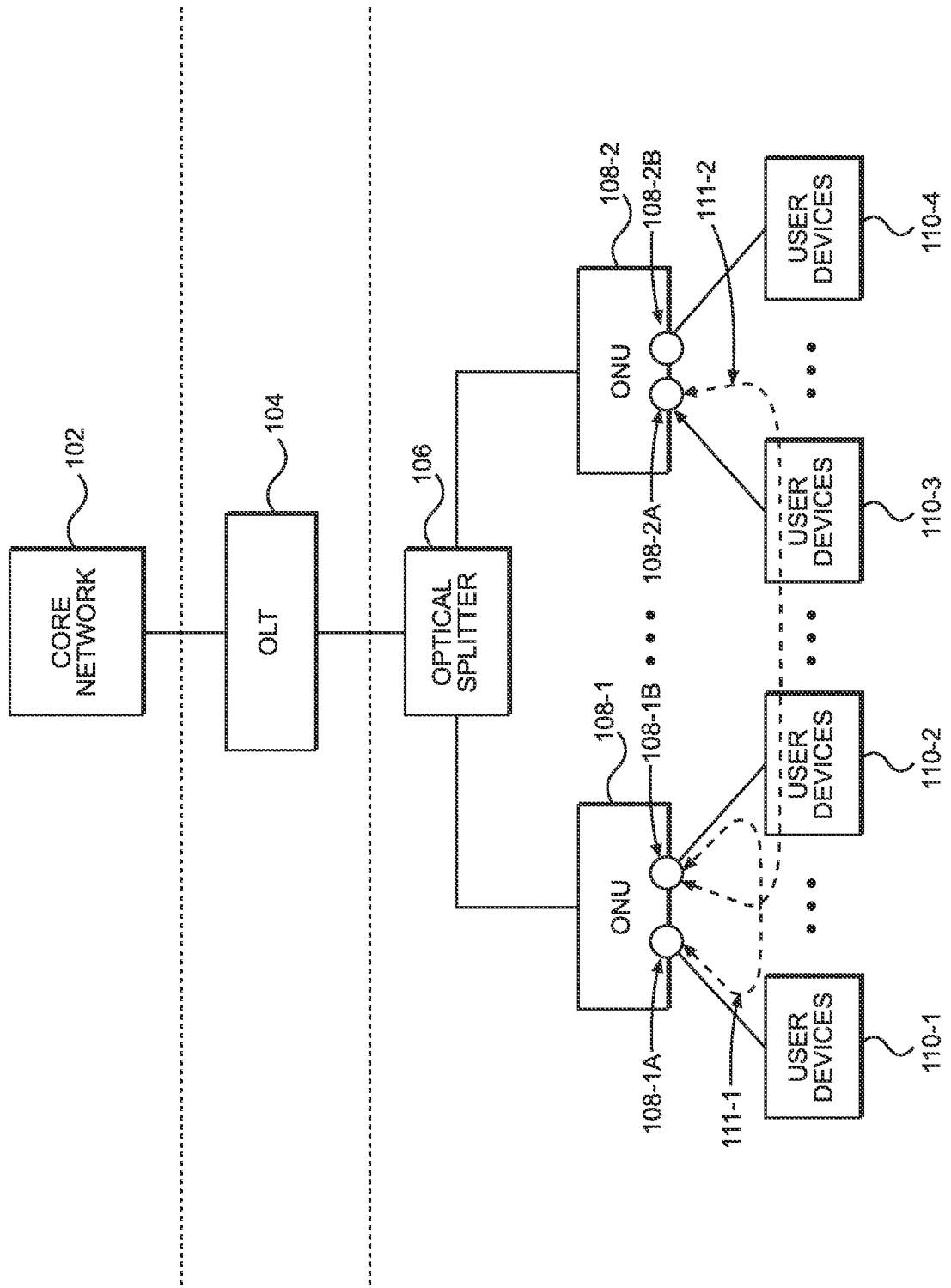

FIG. 1 schematically illustrates an exemplary POL topology wherein loops may occur in the network. In particular, the illustrated network may be GPON based. In the network topology as shown in FIG. 1, there is provided a core network 102 of the operator (or network provider). As is well known, the core network 102 may consist of a number of different network entities (e.g., a gateway) serving different functionalities. Since the present disclosure mainly focuses on the access network part, such detailed network elements of the core network 102 are not shown in FIG. 1 and their respective descriptions are omitted for reasons of conciseness.

The POL network also comprises an OLT 104 connected to the core network (e.g., via optical fibers). A passive 1:N optical splitter 106 is coupled to the OLT 104 (e.g., via optical fibers). In a GPON based network, the number of output ports N of the optical splitter may be 32, or even up to 128. The optical splitter is used for connecting (and providing services to and from) a plurality of ONUs 108-1, 108-2. As mentioned above, in an exemplary enterprise deployment scenario, up to 1000 ONUs may be supported. The ONUs 108-1 and 108-2 may also be connected to the optical splitter 108 via optical fibers. In some cases, the optical splitter together with the fibers (and possibly with some other network elements like optical connectors, etc.) may be collectively referred to as an Optical Distribution Network. Further, each ONU 108-1, 108-2 may have a plurality of ports 108-1A, 108-1B and 108-2A, 108-2B, respectively. Typically, an ONU may have 8, 16, 32, or up to 64 ports. These ONU UNI ports 108-1A, 108-1B and 108-2A, 108-2B are used for connecting user devices 110-1, 110-2, 110-3 and 110-4 (e.g., via Ethernet cables) to the respective ONUs. Notably, the ports of ONUs are typically bidirectional ports which means that both downstream communication and upstream communication are supported via those (bidirectional) ports. These end user devices may be for example desk computers, mobile devices, etc., that are deployed in a home premise or in an enterprise premise. In some cases, the user device may be (indirectly) connected to the ONU via another network entity, e.g., an access point (for instance a Wi-Fi AP) or a switch. Configured as such, the point-to-multipoint GPON based network can provide a high data rate (e.g., ~2.4 Gbit/s downstream and ~1 Gbit/s upstream) at a wide range (e.g., up to 20 km).

Considering the large number of ONU ports present in the network (especially in enterprise deployment scenarios), it would be very like that (physical) loops may occur in the network. For example, a physical loop 111-1 may occur between the ports 108-1A and 108-1B (which connect to user devices 110-1 and 110-2 respectively) on the same ONU 108-1. This loop 111-1 may happen for instance because the two user devices 110-1 and 110-2 are accidentally coupled together by an Ethernet cable, or sometime via a network switch. As another example, another physical loop 111-2 may occur between the ports 108-1B and 108-2A (which connect to user devices 110-2 and 110-3 respectively) on two distinct ONUs 108-1 and 108-2 respectively. Similarly, this loop 111-2 may happen for instance because the two user devices 110-2 and 110-3 are accidentally coupled together by an Ethernet cable. Most of the times, the (physical) loops in the network can be quite disruptive as they may create traffic storms (e.g., by feeding the received data traffic back into the network) which may bring down the network throughput and also impact network services.

Figure 2:
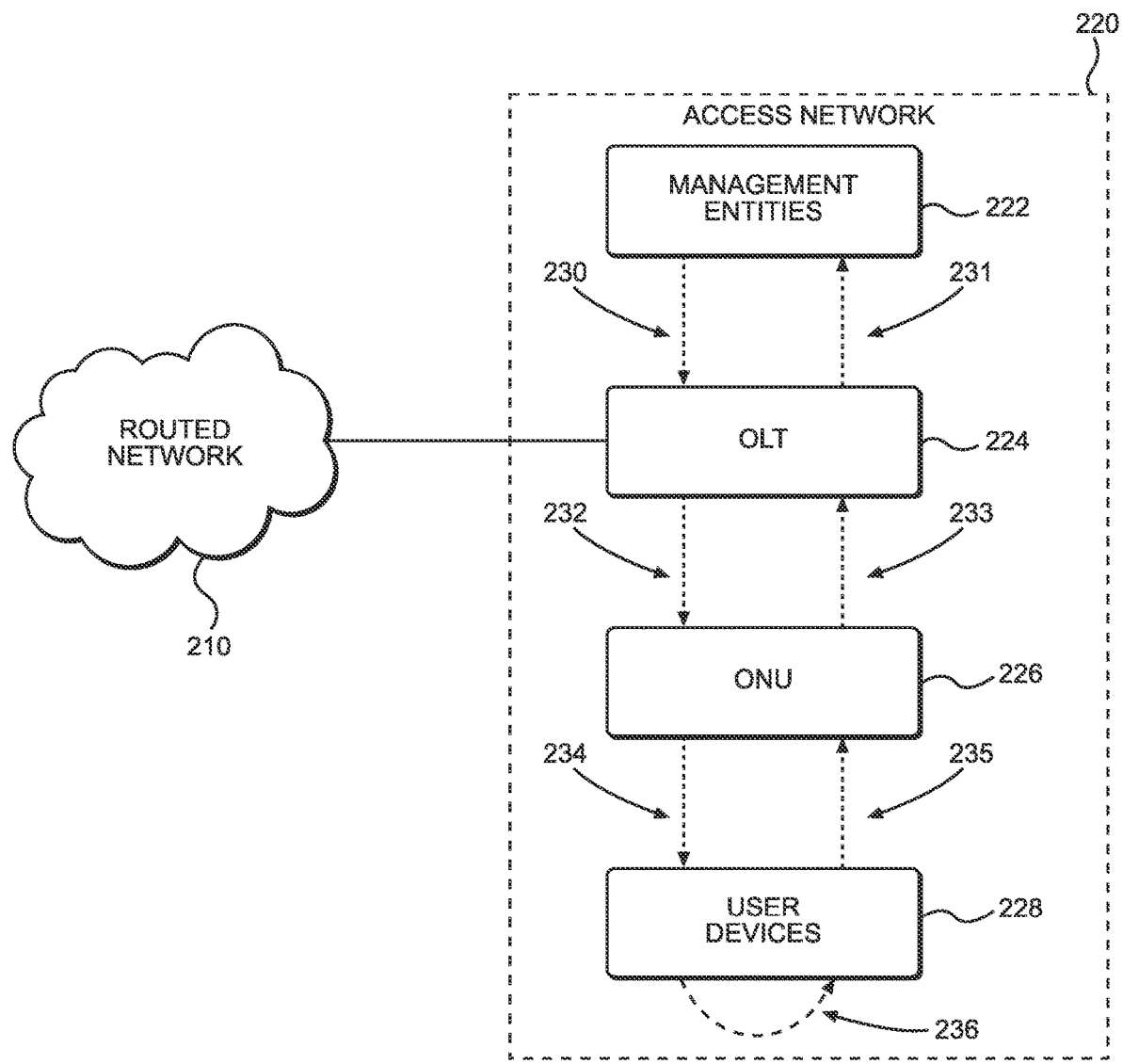
FIG. 2 schematically illustrates an exemplary high level view of provisioning, detection and alarm flows according to an embodiment of the present invention.

FIG. 2 schematically illustrates an example of a high level view of provisioning, detection and alarm flows according to an embodiment of the present invention. In particular, a high level view of a GPON based access network 220 is shown. Within the access network 220, an OLT node 224 is provided which may possibly connect with many ONUs via fiber or GPON, as illustrated above. Block 226 may refer to one ONU node or a collective of multiple ONUs, each with multiple user ports for connecting respective user devices or local switches. Thus, for illustration purpose only, it may be simply referred to as ONU 226. Similarly, block 228 may refer to a collective of multiple user devices, and thus may be simply referred to as user devices 228. Additionally, the OLT 224 may be connected to other management entities 222 in the network (e.g., the EMS/OSS). Yet further, the OLT 224 may also be connected to a routed network 210, which will not be described here in detail.

Based on the service provisioned, the management entity (e.g., the EMS/OSS) 222 of the operator may send messages 230 to the OLT 224 for indicating whether loop detection functionality should be enabled or disabled on the respective ONU ports. Subsequently, the OLT 224 may send messages 232 to the ONU 226 for indicating whether loop detection functionality should be enabled or disabled on the respective ports. In particular, the messages 232 may be sent via GPON OMCI signaling (messages). In order to detect loops between ports, the ONU 226 may generate and transmit messages (i.e., loop detection frames) 234 on its ports towards the user devices 228. In particular, the loop detection frames (packets) 234 may be generated and transmitted for each port periodically.

Once a transmitted loop detection frame 234 is received at a (destination) port in message 235, it implies that a possible loop 236 may exist in the network and that the loop 236 is detected by the (destination) port. Responsively, apart from the blocking process which will be described in detail in below figures, the ONU 236 may generate and send an alarm message 233 for reporting the detected loop to the OLT. Similar to the message 232, the message(s) 233 may also be sent via GPON OMCI signaling (messages). Upon reception of the alarm message 233 at the OLT 224, the OLT 224 may forward the detected alarm to the management entity 222 via messages 231. It is possible that the messages 231 and 233 may using different protocols, such that messages 231 and 233 may be encoded in different formats and/or may contain different contents, which is readily known to the skilled person in the art. Furthermore, it is to be noted that messages 233 and 231 may also represent messages for indicating that the detected loop has been removed and that the previously sent alarm can be cleared at the OLT 224 and the management entity 222, if such alarm clearance functionality is implemented in the network.

Figure 3A:
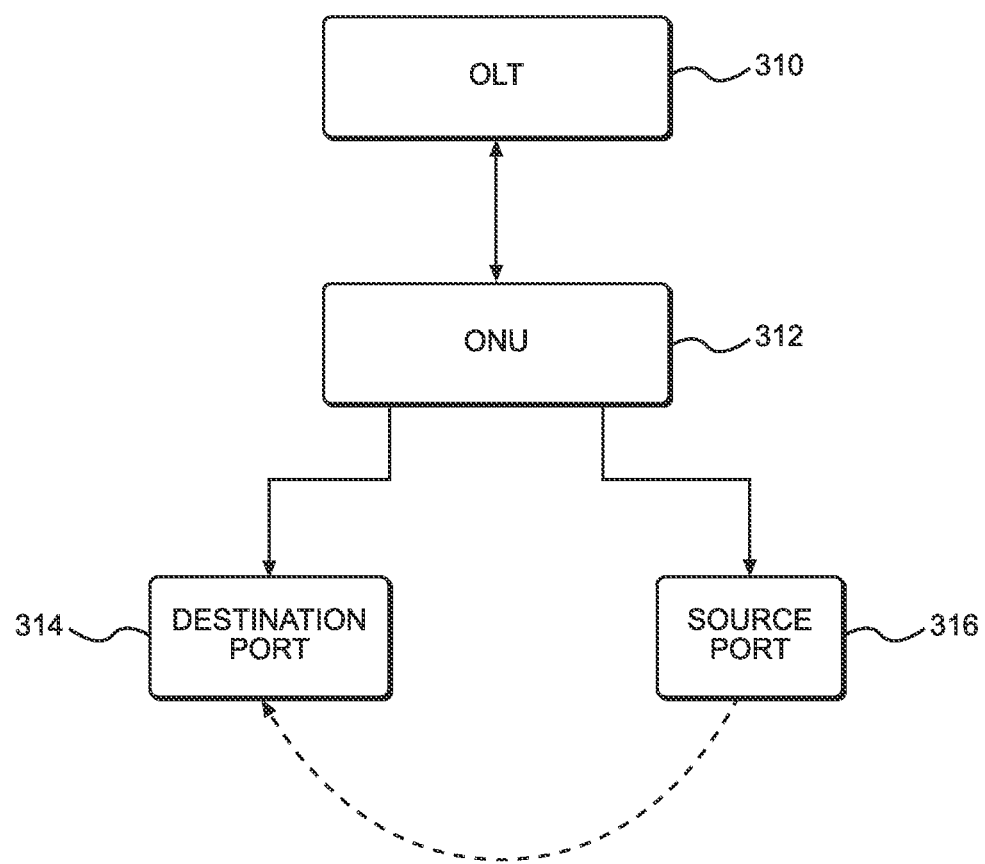
FIG. 3-A schematically illustrates an exemplary loop detection message flow according to an embodiment of the present invention.
Figure 3B:
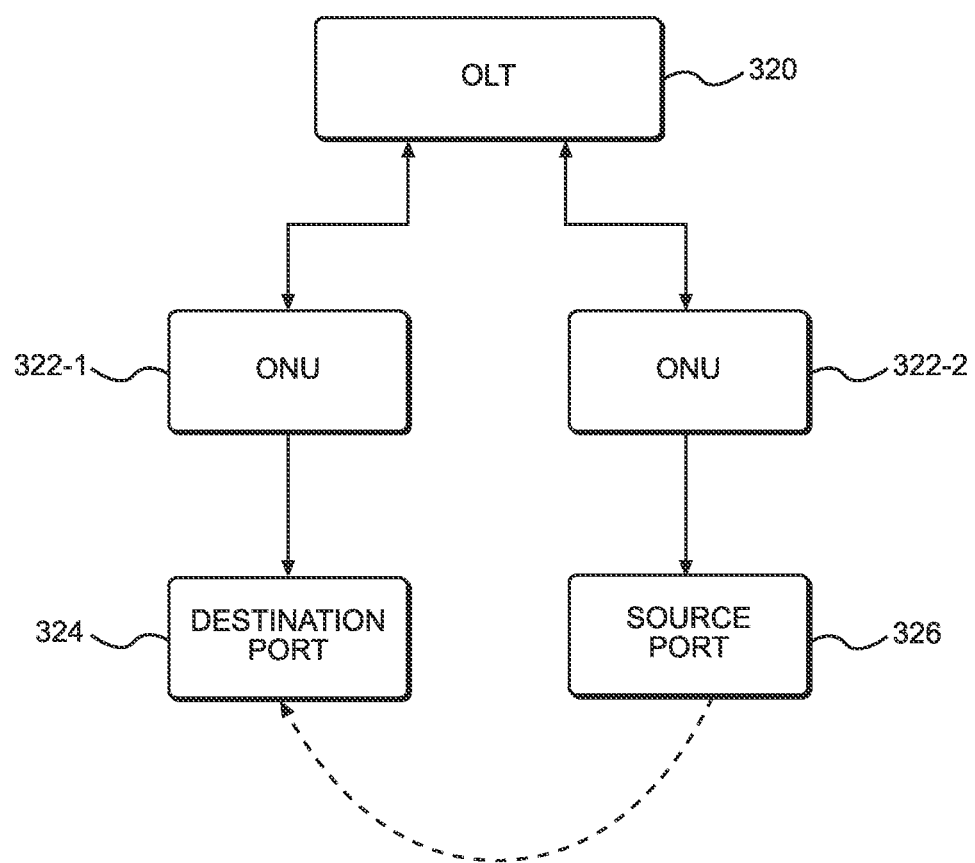

FIGS. 3-A and 3-B schematically illustrate exemplary loop detection message flows according to embodiments of the present invention. In particular, FIG. 3-A relates to a loop occurred between ports of the same ONU. On the other hand, FIG. 3-B relates to a loop occurred between ports of two different ONUs.

In FIG. 3-A, an OLT 310 is provided which may possibly be connected to a large number of ONUs. In the present example as shown in FIG. 3-A, only one ONU 312 is provided to be connected to the OLT 310. The ONU 312 may communicate with the OLT 310 in both directions (i.e., upstream and downstream), possibly using the GPON OMCI protocol. In the present example, the ONU 312 is provided with two ports, namely a destination port 314 and a source port 316. In order to detect potential loops in the network, the source port 316 may generate and send out a loop detection frame (packet). The loop detection frame may comprise details that are need to identify the detected loop. In particular, such details may include the MAC address of the ONU 312, the serial number of the ONU 312, and the port ID of the source port 316. These details may be encoded (encapsulated) in such a manner that can be easily detectable and understandable by the receiving port(s). A possible example of the encoding (encapsulation) implementation can be seen in FIG. 5, which will be described below in detail. Once the transmitted loop detection frame is received by the destination port 314, it can then be concluded that a loop exists in the network system, by which the destination port 314 is affected. Subsequent operations (e.g., blocking the destination port 314, reporting an alarm message to the OLT 310, etc.) may be performed according to the proposed method as illustrated above.

Similarly, in FIG. 3-B, identical or like reference numbers indicate identical or like elements in FIG. 3-A, and repeated description thereof may be omitted for reasons of conciseness. In particular, compared to FIG. 3-A, there are provided two different ONUs 322-1, 322-2 in FIG. 3-B (instead of only one ONU 312 in FIG. 3-A). Furthermore, compared to FIG. 3-A where the source and destination ports 316, 314 reside on the same ONU 312, in FIG. 3-B the source port 326 belongs to the ONU 322-2 and the destination port 324 belongs to another ONU 322-1. Configured as such, the present example in FIG. 3-B shows a possible loop scenario occurs across different ONUs (i.e., 322-1 and 322-2). The operations (e.g., blocking the destination port 324, reporting an alarm message to the OLT 320, etc.) may be performed analogously or similarly to that of FIG. 3A, as illustrated above.

Figure 4:
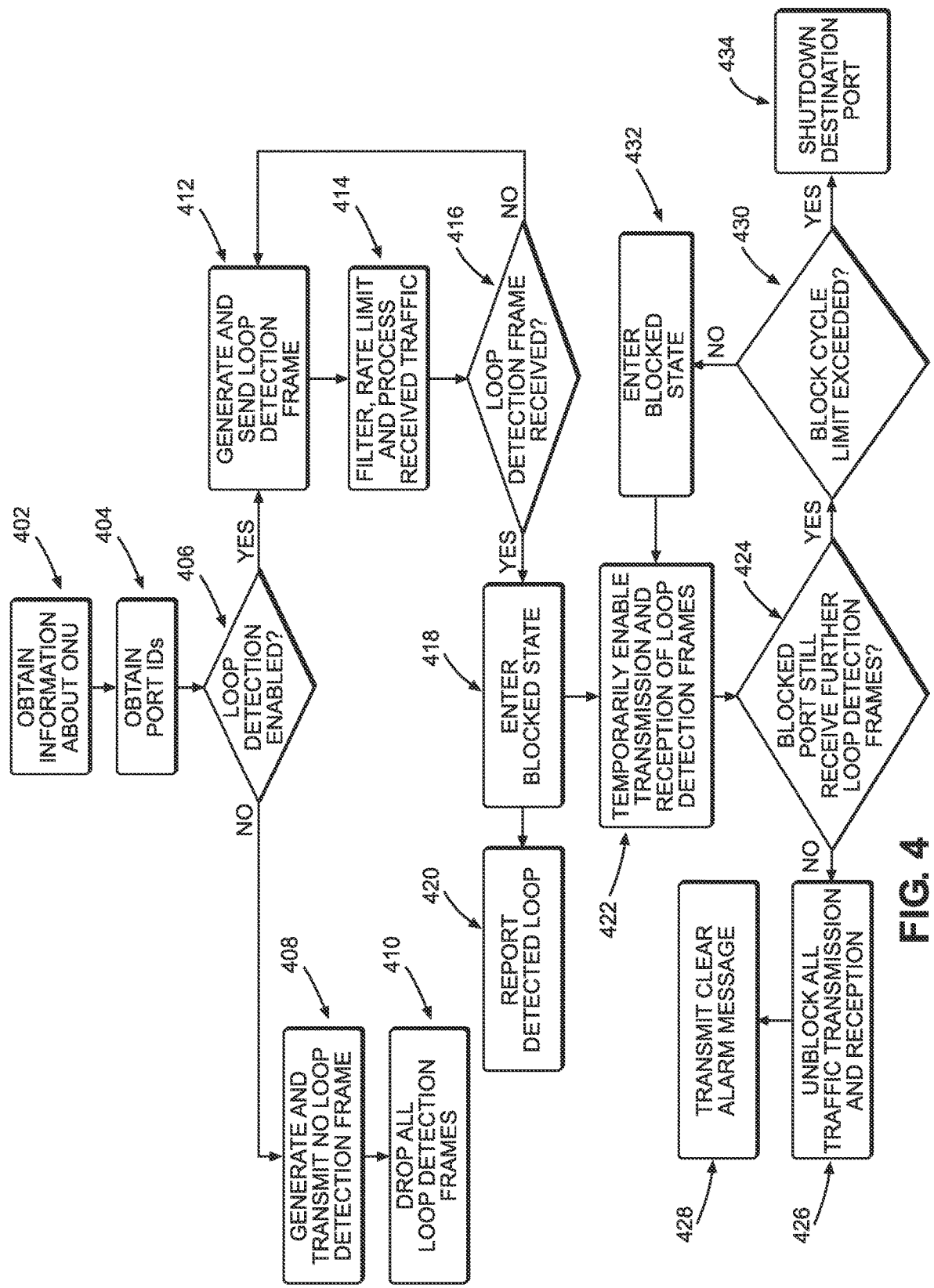
FIG. 4 schematically shows an exemplary flow chart for loop detection according to an embodiment of the present invention.

FIG. 4 schematically shows an exemplary flow chart of a method 400 for (physical) loop detection according to an embodiment of the present invention. In particular, the method 400 may start with step 402 where specific information about an ONU may be obtained (e.g., the MAC address of the ONU, and the serial number of the ONU). The method 400 may then continue to step 402 where the respective IDs of the ports of the ONU may be obtained. For one port of the multiple ports which the ONU controls, the method 400 may check in step 406 whether the loop detection functionality is enabled or not.

If such loop detection functionality is disabled (or not supported) at that port, no loop detection frame will be generated and transmitted in step 408. In this case, in step 410 the port will also drop all the loop detection frames received at that port, for example by hardware filtering based on the type of the received data packets.

On the other hand, if the loop detection functionality is supported and enabled at that port, the method 400 may continue with step 412 where the loop detection frame is generated and sent out on that port. The loop detection frame may include detailed information about the MAC address of the ONU, the serial number of the ONU and the port IDs of that specific port. These details may be further encoded (encapsulated) into a PDU (e.g., put into a Source MAC address field of the PDU) suitable for transmission across the user network. Preferably, such loop detection frame may be transmitted periodically, e.g., at an interval value between 100 milliseconds to 10 seconds, depending on the hardware capability of the ONU and/or other system requirements. The method 400 may then continue with step 414 where a (destination) port may filter, rate limit and process the traffic reception at that (destination) port. Next, at step 416, based on the analysis performed at step 414, the destination port may check whether a loop detection frame packet is received or not. If no loop detection frame is received so far, the method 400 may return back to step 412.

If the loop detection frame is received by the destination port, which basically indicates that a loop exists in the network, the method 400 may continue with step 418 where the (destination) port is blocked for all traffic transmission and reception. That is to say, once the loop detection frame is received at the destination port, no (further) data packet will be transmitted from the destination port. Moreover, any data packet received at the destination port would be (immediately) dropped (e.g., by hardware filtering). The blocked state of the port may last for a predetermined time period (e.g., may be referred to as "PORT_BLOCK_PERIOD"). Subsequently, the method 400 may continue to report the detected loop incidence from the port of the ONU to the OLT in step 420. Next, the method 400 may also continue to step 422 where the transmission and reception of (only) further loop detection frames may be temporarily enabled at the blocked destination port, shortly before the PORT_BLOCK_PERIOD expires (e.g., at 80% of the PORT_BLOCK_PERIOD). Notably, in some cases, in particular when the source port and the destination ports are two distinct ports, it might be sufficient to enable only the reception of further loop detection frames (which will be generated and sent out from the source port) at the destination port. However, in some special cases, it is possible that the physical loop in the network may cause the port's own transmission packets (e.g., the loop detection packet, or other data packets) to loop back to the same port. That is to say, in this particular case, the source port (where the loop detection frame is generated/transmitted) and the destination port (where the loop detection frame is received) are essentially the same port. In order to capture this kind of specific scenario, it would then be preferable to also (temporarily) enable transmission of further loop detection frames, instead of only enabling reception of the loop detection frames which might be sufficient in some cases (e.g., when the source port and the destination ports are two distinct ports).

After the blocked destination port is temporarily awake (enabled), the method 400 may continue to step 424 to check whether the blocked destination port can still receive further loop detection frame(s). If no further loop detection frame is received at the destination port until the predetermined PORT_BLOCK_PERIOD expires, the method 400 may continue with step 426 where all of the traffic transmission and reception will be unblocked (upon expiry of the predetermined PORT_BLOCK_PERIOD). The method 400 may also comprise to subsequently transmit a clear alarm message to the OLT for clearing the previously reported loop alarm in step 428.

On the other hand, a further loop detection frame may be received at the destination port before the PORT_BLOCK_PERIOD expires (after temporarily enabling the transmission and reception of loop detection frames in step 422). This reception of further loop detection frame implies that there is still a loop existing in the network system. In this case, the method 400 may continue with step 430 where it is checked whether there are already too many block cycles. If it is the case that the destination port has already been blocked for too many times (e.g., exceeding a predetermined limit), that destination port may be completely shut down in step 434. In this case, the port may need manual intervention to be brought up again into use, only after the physical loop is confirmed to be removed. Otherwise, the method 400 may continue with another step 432 where the destination port stops (immediately) the temporary transmission and reception of the further loop detection frames and is put back to the blocked state again for another PORT_BLOCK_PERIOD after the present PORT_BLOCK_PERIOD gets expired. Next, the method 400 may return back to step 422 and continue as illustrated above. Notably, by temporarily enabling the transmission and reception of further loop detection frames (shortly) before the block period expires (instead of directly unblocking the port after the block period expiry), the port can check whether a loop still exists in the network or not, so that undesirable toggling of the ports (i.e., unnecessary toggling between the blocked and unblocked states) may be avoided (or reduced).

Figure 5:
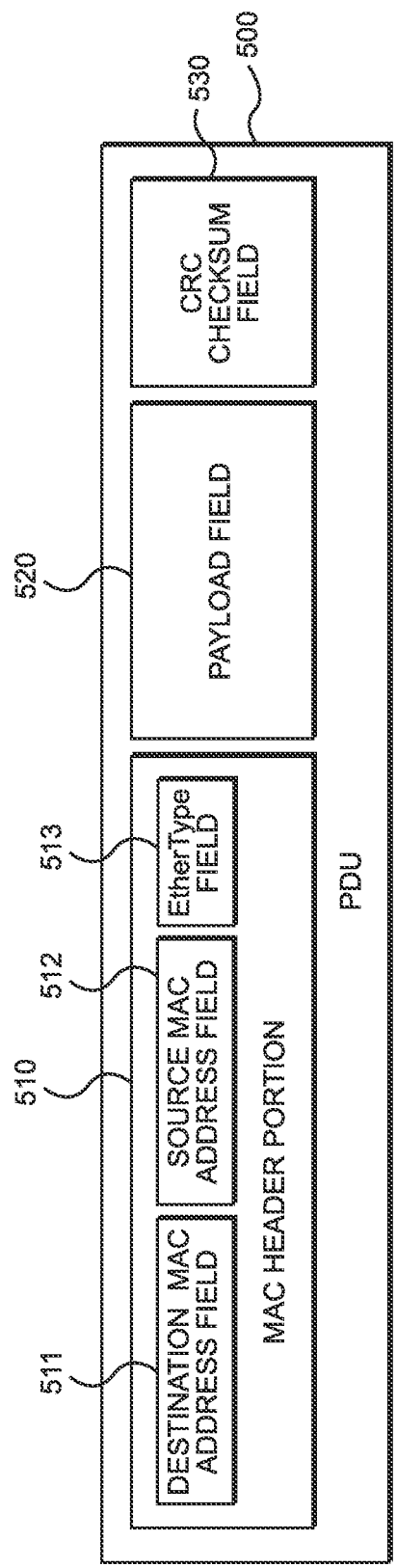
FIG. 5 schematically shows an exemplary structure of a PDU in compliance with the Ethernet II standard.

As mentioned above, the loop detection frame may be encoded (encapsulated) in such a manner that is easily detectable and understandable by the receiving port(s). A possible example of the encoding (encapsulation) implementation according to the Ethernet II framing standard is shown in FIG. 5.

In particular, according to the Ethernet II framing standard, an Ethernet II compliant PDU 500 consists of three portions, namely a MAC Header portion 510, a Data (Payload) portion 520 and a CRC checksum portion 530. Furthermore, the MAC Header portion 510 may be sub-divided into three fields, namely a Destination MAC address field 511, a Source MAC address field 512 and an EtherType field 513. In particular, according to the standard, the Destination MAC Address 511 and the Source MAC Address 512 both occupy 6 bytes, the EtherType field 513 occupies 2 bytes, the CRC checksum field 530 occupies 4 bytes, and the Payload field 520 can occupy from 46 bytes up to 1500 bytes. The 2-octet EtherType field 513 is used to indicate the type of the PDU. For instance, an EtherType value set to 0x9000 implies that the PDU is an Ethernet Configuration Testing Protocol loopback PDU. Moreover, in the Ethernet Configuration Testing Protocol loopback PDU 500, the Source MAC Address field 512 and the Destination MAC Address field 511 are filled with the same value. In other words, the Source MAC Address 512 is set to be equal to the Destination MAC Address 511. Also, in a typical Ethernet Configuration Testing Protocol loopback PDU 500, the Payload filed 520 occupies 46 bytes and is generally filled with all zeros. Notably, by using the standard Ethernet II protocol, the filtering (e.g., hardware filtering) of the received traffic at the receiving (destination) port could be easily achieved, e.g., by parsing (dissecting) the EtherType field 513 of the received data packets.

Depending on different circumstances and requirements, various approaches may be applied to perform the actual encoding (encapsulation) of the loop detection frame so that the details of the loop detection frame can fit in the Ethernet II PDU, in particular the CTP PDU.

For example, the MAC address of the ONU to which the respective source port belongs, the serial number of the ONU to which the respective source port belongs, and the port ID of the respective source port may be coded into the Source MAC Address field 512 of the CTP PDU 500. Notably, since the Source MAC Address field 512 occupies only 6 bytes (which may for example be represented in the format of ZZ:XX:XX:XX:XX:YY), not all the detailed information of the loop detection frame can be completely fit into this 6-octet Source MAC Address field 512. Consequently, certain operations (e.g., truncation or the like) might be necessary to ensure that the encoded loop detection frames (packets) for each UNI port can be used to easily and clearly (unambiguously) identify the (source) port and its corresponding ONU.

For instance, the port ID of the source port may be filled into the "YY" portion of the Source MAC Address field 512. In typical deployments, one byte should be sufficient for distinguishing the ports from each other (from a local scope). Next, the last four bytes of the serial number (since a serial number typically occupies 8 bytes) may be filled into the "XX" portion of the Source MAC Address field 512. Finally, the "ZZ" portion of the Source MAC Address field 512 may be filled similarly, for example by a part of the MAC address of the ONU to which the respective source port belongs, or by some other value alike that could be used to serve the purpose. Configured as such, a value to be used as MAC address that is unique across the POL network can be defined and utilized, for each of the ONU UNI ports.

As another example, the Payload field 520 of the CTP PDU (which is generally filled with all zeros, i.e., unused) can be exploited in order to completely fit in all the information of the loop detection frame (without truncation). In such case, the Source MAC Address field 512 of the CTP PDU 500 may be filled with the (complete) MAC address of the ONU to which the respective source port belongs, and the (complete) 8-byte serial number of the ONU to which the respective source port belongs and the 1-byte port ID of the respective source port can be coded into the Payload field 520 of the PDU 500. For instance, the ONU serial number and the port ID may be filled into the first 9 bytes of the Payload field 520. Notably, no truncation operations would be necessary in this example. Moreover, the unused bytes of the Payload field 520 of the CTP PDU 500 may be further exploited (e.g., to fill in additional information that needs to further identify the loop), if needs be.

Configured as such, the encoded loop detection frame can be used in the POL network such that the potential physical loops that may occur in the network can be correctly and efficiently detected and handled.

It should be noted that the apparatus features described above correspond to respective method features that may however not be explicitly described, for reasons of conciseness. The disclosure of the present document is considered to extend also to such method features. In particular, the present disclosure is understood to relate to methods of operating the control unit described above.

It should further be noted that the description and drawings merely illustrate the principles of the present disclosure. Those skilled in the art will be able to implement various arrangements that, although not explicitly described or shown herein, embody the principles of the invention and are included within its spirit and scope. Furthermore, all examples and embodiment outlined in the present disclosure are principally intended expressly to be only for explanatory purposes to help the reader in understanding the principles of the proposed method. Furthermore, all statements herein providing principles, aspects, and embodiments of the invention, as well as specific examples thereof, are intended to encompass equivalents thereof.

The invention claimed is:

1. A method for detecting loops between ports in a Gigabit Passive Optical Network (GPON) based access network, the GPON based access network including an Optical Line Terminal (OLT) coupled with a plurality of Optical Network Units (ONUs), the method comprising:
   monitoring traffic received at a destination port of one of the ONUs;
   temporarily blocking traffic transmission and reception at the destination port in response to receipt, at the destination port, of a loop detection frame transmitted from a source port of the same one or a different one of the ONU; and
   enabling the destination port for transmitting and receiving further loop detection frames before an end of a period previously set for expiration of the act of temporarily blocking.

2. The method according to claim 1, wherein the loop detection frame comprises a media access control (MAC) address of a respective ONU of the source port, a serial number of the respective ONU of the source port, and a port ID of the source port.

3. The method according to claim 1, wherein the destination port is blocked for the period before subsequently being unblocked.

4. The method according to claim 1, further comprising:
   unblocking traffic transmission and reception at the destination port in response to no further loop detection frame being received at the destination port before the end of the period previously set for expiration of the act of temporarily blocking.

5. The method according to claim 1, further comprising:
   blocking traffic transmission and reception at the destination port again in response to receipt of a further loop detection frame at the destination port before the end of the period previously set for expiration of the act of temporarily blocking.

6. The method according to claim 5, further comprising: completely shutting down the destination port in response to a total time period of the destination port being blocked exceeding a threshold time limit.

7. The method according to claim 2, wherein the loop detection frame is generated as a Protocol Data Unit (PDU) according to Ethernet Configuration Testing Protocol defined by the Ethernet II standard, wherein an EtherType field of the PDU is set to a first value.

8. The method according to claim 7, wherein the serial number of the respective ONU of the source port and the port ID of the source port are encoded into a Source MAC Address field of the PDU.

9. The method according to claim 7, wherein the MAC address of the respective ONU of the source port is encoded into a Source MAC Address field of the PDU, and the serial number of the respective ONU of the source port and the port ID of the source port are encoded into a Payload field of the PDU.

10. The method according to claim 1, wherein the source port and the destination port belong to the same ONU.

11. The method according to claim 1, further comprising: reporting an alarm message about a detected loop to the OLT after blocking the destination port.

12. The method according to claim 1, wherein the loop detection frame is periodically sent from a source port of a respective ONU.

13. A controller for detecting loops between ports in a Gigabit Passive Optical Network (GPON) based access network, the GPON based access network including an Optical Line Terminal (OLT) coupled with a plurality of Optical Network Units (ONUs), the controller comprising:
a processor; and
a memory including computer program code, the memory and the computer program code configured to, with the processor, cause the controller to
monitor traffic received at a destination port of one of the ONUs;
temporarily block traffic transmission and reception at the destination port in response to receipt, at the destination port, of a loop detection frame transmitted from a source port of the same one or a different one of the ONUs; and
enable the destination port for transmitting and receiving further loop detection frames before an end of a period previously set for expiration of the act of temporarily blocking.

14. The controller according to claim 13, wherein the controller is included within an ONU.

15. The method of claim 7, wherein the EtherType field of the PDU is set to 0x9000.

16. The method according to claim 1, wherein the source port and the destination port belong to different ONUs.

17. The method according to claim 11, further comprising:
reporting a clear alarm message to the OLT for clearing the alarm message in response to unblocking the destination port.

18. The method according to claim 12, further comprising:
blocking traffic transmission and reception at the source port in response to a number of loops detected for the source port exceeding a loop limit.

* * * * *

UNITED STATES PATENT AND TRADEMARK OFFICE
CERTIFICATE OF CORRECTION

| | |
|---|---|
| PATENT NO. | : 11,050,486 B2 |
| APPLICATION NO. | : 16/783674 |
| DATED | : June 29, 2021 |
| INVENTOR(S) | : Aravindan Jagannathan |

It is certified that error appears in the above-identified patent and that said Letters Patent is hereby corrected as shown below:

In the Claims

Column 14, Line number 46: in Claim 1, delete "ONU" and insert -- ONUs --

Signed and Sealed this
Thirteenth Day of September, 2022

*Katherine Kelly Vidal*

Katherine Kelly Vidal
*Director of the United States Patent and Trademark Office*